US012698801B2

(12) United States Patent (10) Patent No.: US 12,698,801 B2

Piotrowski (45) Date of Patent: Aug. 4, 2026

(54) AIRCRAFT ENGINE HYBRID ROLLER BEARING

(71) Applicant: Pratt & Whitney Canada Corp., Longueuil (CA)

(72) Inventor: Maciej Piotrowski, Rzeszów (PL)

(73) Assignee: PRATT & WHITNEY CANADA CORP., Longueuil (CA)

(*) Notice: Subject to any disclaimer, the term of this patent is extended or adjusted under 35 U.S.C. 154(b) by 40 days.

(21) Appl. No.: 18/737,126

(22) Filed: Jun. 7, 2024

(65) Prior Publication Data

US 2025/0377022 A1 Dec. 11, 2025

(51) Int. Cl.
 *F16C 33/30* (2006.01)

(52) U.S. Cl.
 CPC ........ *F16C 33/303* (2013.01); *F16C 2202/22* (2013.01); *F16C 2240/56* (2013.01); *F16C 2326/43* (2013.01); *F16C 2360/23* (2013.01)

(58) Field of Classification Search
 CPC .... F16C 19/26; F16C 33/303; F16C 2202/22; F16C 2240/56; F16C 2326/43; F16C 2360/23; F01D 25/16
 See application file for complete search history.

(56) References Cited

U.S. PATENT DOCUMENTS

| | | | |
|---|---|---|---|
| 6,877,904 B2 | 4/2005 | Bouille | |
| 8,678,661 B2 | 3/2014 | Norimatsu | |
| 2006/0182376 A1 | 8/2006 | Burwell | |
| 2011/0194799 A1 | 8/2011 | Parsley et al. | |
| 2015/0219148 A1 | 8/2015 | Wemhoener | |
| 2018/0335087 A1* | 11/2018 | Fisher | F04D 29/059 |
| 2019/0301523 A1 | 10/2019 | Hart | |
| 2020/0124101 A1 | 4/2020 | Rivera | |
| 2021/0317878 A1* | 10/2021 | Maiwa | F16C 33/6688 |

FOREIGN PATENT DOCUMENTS

| | | | |
|---|---|---|---|
| CN | 104847786 A | 8/2015 | |
| CN | 208281369 U | 12/2018 | |
| DE | 102017121009 A1 * | 3/2019 | F16C 19/00 |
| JP | 2001065557 A | 3/2001 | |
| JP | 2006342882 A * | 12/2006 | F16C 33/34 |
| WO | 2017202404 A1 | 11/2017 | |

OTHER PUBLICATIONS

Machine Translation of JP-2006342882-A (Year: 2006).*
Machine Translation of DE-102017121009-A1 (Year: 2019).*
Search Report issued in European Patent Application No. 25181594.0; Date of Mailing Oct. 27, 2025 (12 pages).

* cited by examiner

*Primary Examiner* — Alan B Waits

(74) *Attorney, Agent, or Firm* — CANTOR COLBURN LLP

(57) ABSTRACT

An aircraft engine hybrid roller bearing is provided. The aircraft engine hybrid roller bearing includes an inner race, an outer race, bearing rollers radially interposed between the inner race and the outer race to support relative rotation of the inner race and the outer race and a cage configured to secure each of the bearing rollers at a distance from each neighboring bearing roller. The bearing rollers are provided in an arrangement including first and second contiguous sets of bearing rollers formed of a first material type and first and second contiguous sets of bearing rollers formed of a second material type.

10 Claims, 2 Drawing Sheets

120
140
110

130

120

130

110

A

B

IRC (or diametral play)=
=2*(A + B)

AIRCRAFT ENGINE HYBRID ROLLER BEARING

BACKGROUND

The present disclosure relates to roller bearings and, more particularly, to an aircraft engine hybrid roller bearing with mixed steel and ceramic rollers.

A ball or roller bearing is a type of rolling-element bearing that uses balls or rollers to maintain separation between bearing races. The purpose of a ball or roller bearing is to reduce rotational friction and to support radial and axial loads. The ball or roller bearing achieves this by using at least two races to contain the balls or rollers and to transmit the loads through the balls or rollers. In most applications, one race is stationary and the other is attached to the rotating assembly (e.g., a hub or shaft). As one of the bearing races rotates it causes the balls or rollers to rotate as well. Because the balls or rollers are rolling they have a much lower coefficient of friction than if two flat surfaces were sliding against each other.

BRIEF DESCRIPTION

According to an aspect of the disclosure, an aircraft engine hybrid roller bearing is provided. The aircraft engine hybrid roller bearing includes an inner race, an outer race, bearing rollers radially interposed between the inner race and the outer race to support relative rotation of the inner race and the outer race and a cage configured to secure each of the bearing rollers at a distance from each neighboring bearing roller. The bearing rollers are provided in an arrangement including first and second contiguous sets of bearing rollers formed of a first material type and first and second contiguous sets of bearing rollers formed of a second material type.

In accordance with additional or alternative embodiments, the arrangement of the bearing rollers is symmetric.

In accordance with additional or alternative embodiments, the first and second contiguous sets of bearing rollers of the first material type respectively include equal numbers of one or more bearing rollers and the first and second contiguous sets of bearing rollers of the second material type respectively include equal numbers of one or more bearing rollers.

In accordance with additional or alternative embodiments, the arrangement of the bearing rollers is asymmetric.

In accordance with additional or alternative embodiments, the first and second contiguous sets of bearing rollers of the first material type respectively include equal or unequal numbers of one or more bearing rollers and the first and second contiguous sets of bearing rollers of the second material type respectively include equal or unequal numbers of one or more bearing rollers.

In accordance with additional or alternative embodiments, the arrangement of the bearing rollers is tuned to a specific roller bearing frequency response.

In accordance with additional or alternative embodiments, the first material type has a first characteristic coefficient of thermal expansion (CTE) range and the second material type has a second characteristic CTE range differing from the first characteristic CTE range.

In accordance with additional or alternative embodiments, the first material type includes ceramic and the second material type includes steel.

In accordance with additional or alternative embodiments, an internal radial clearance (IRC) is tuned for tight to negative steel roller bearing clearance.

According to an aspect of the disclosure, an aircraft engine hybrid roller bearing is provided. The aircraft engine hybrid roller bearing includes an inner race, an outer race, bearing rollers radially interposed between the inner race and the outer race to support relative rotation of the inner race and the outer race and a cage configured to secure each of the bearing rollers at a distance from each neighboring bearing roller. The bearing rollers are provided in a symmetric arrangement including first and second contiguous circumferential lines of equal numbers of one or more bearing rollers formed of a first material type and first and second contiguous circumferential lines of equal numbers of one or more bearing rollers formed of a second material type.

In accordance with additional or alternative embodiments, the first and second contiguous circumferential lines of the one or more bearing rollers of the second material type respectively include one and only one bearing roller.

In accordance with additional or alternative embodiments, the first material type has a first characteristic coefficient of thermal expansion (CTE) range and the second material type has a second characteristic CTE range differing from the first characteristic CTE range.

In accordance with additional or alternative embodiments, the first material type includes ceramic and the second material type includes steel.

In accordance with additional or alternative embodiments, an internal radial clearance (IRC) is tuned for tight to negative steel roller bearing clearance.

According to an aspect of the disclosure, an aircraft engine hybrid roller bearing is provided. The aircraft engine hybrid roller bearing includes an inner race, an outer race, bearing rollers radially interposed between the inner race and the outer race to support relative rotation of the inner race and the outer race and a cage configured to secure each of the bearing rollers at a distance from each neighboring bearing roller. The bearing rollers are provided in an asymmetric arrangement including first and second contiguous circumferential lines of equal or unequal numbers of one or more bearing rollers formed of a first material type and first and second contiguous circumferential lines of equal or unequal numbers of one or more bearing rollers formed of a second material type.

In accordance with additional or alternative embodiments, the first and second contiguous circumferential lines of the one or more bearing rollers of the second material type respectively include one and only one bearing roller.

In accordance with additional or alternative embodiments, the arrangement of the bearing rollers is tuned to a specific roller bearing frequency response.

In accordance with additional or alternative embodiments, the first material type has a first characteristic coefficient of thermal expansion (CTE) range and the second material type has a second characteristic CTE range differing from the first characteristic CTE range.

In accordance with additional or alternative embodiments, the first material type includes ceramic and the second material type includes steel.

In accordance with additional or alternative embodiments, an internal radial clearance (IRC) is tuned for tight to negative steel roller bearing clearance.

Additional features and advantages are realized through the techniques of the present disclosure. Other embodiments and aspects of the disclosure are described in detail herein and are considered a part of the claimed technical concept.

For a better understanding of the disclosure with the advantages and the features, refer to the description and to the drawings.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
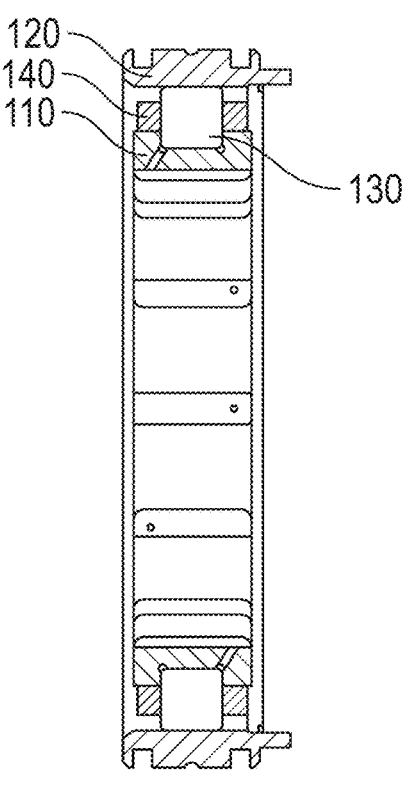
FIG. 1 is a side view of an aircraft engine roller bearing in accordance with embodiments.
Figure 2:
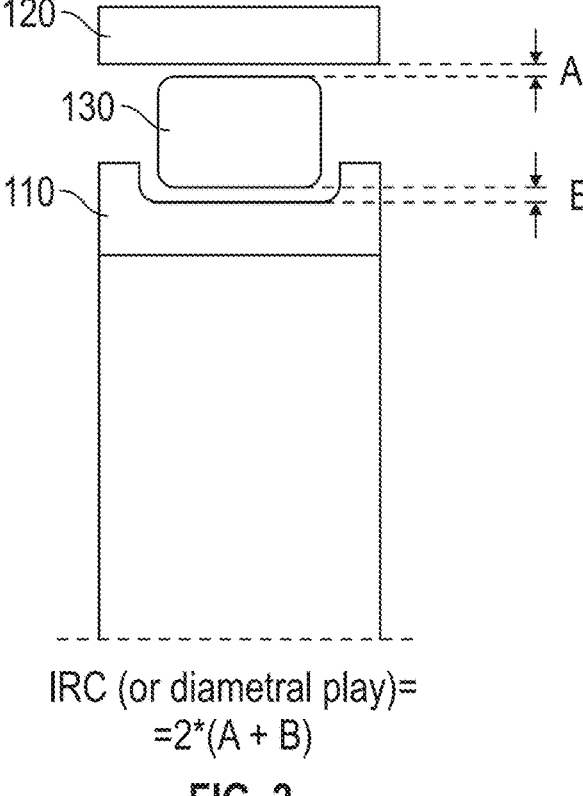
FIG. 2 is an enlarged side view of a portion of the aircraft engine roller bearing of FIG. 1 in accordance with embodiments.

Usually, in a roller bearing with a stationary outer ring, an inner ring moves circumferentially with a same speed as a shaft and rollers, which are separated from one another by a cage, move with roughly 50% shaft speed (an exact percentage depends on bearing proportions). When the roller bearing, especially one designed for high-speeds is lightly loaded, the rollers may start to skid and thus reduce cage speed. Skidding magnitude is usually given as a percentage, where 0% indicates that cage is moving with its nominal speed with the rollers rolling perfectly without sliding and where 100% indicates roller skid with the cage not moving circumferentially at all.

When rollers skid and do not roll, there is a risk that oil film can be wiped out and a raceway can be damaged due to metal-to-metal contacts. In one solution, preventing excessive skidding is achieved by preloading the roller bearing by introducing locally tight or negative internal radial clearance (IRC) due to oversized hollow rollers or a specially shape outer or inner ring. This solution tends to be expensive however.

Thus, as will be described below, an aircraft engine hybrid roller bearing is provided with mixed roller materials to address skidding for use in an aircraft engine. All rollers of the hybrid bearing would be made from ceramics (i.e., Silicon Nitride, ASTM F2094, etc.) except for a small number made from steel. Steel rollers can be arranged circumferentially symmetrically or asymmetrically to change bearing frequency response. All the rollers would be geometrically identical for cost reduction and for standardization at least initially, but will change in size due to differences between thermal coefficients of expansion (CTEs) between the steel rollers and the ceramic rollers. That is, the steel rollers will increase in size to a greater extent than the ceramic rollers. An IRC of the roller bearing is tuned for those few steel rollers to be tight or negative at operation (200 F-350 F and given rotational speed), depending on the needed preload. The ceramic rollers, which expand less than the steel rollers, will work under a more open IRC and not excessively overload the rings.

With reference to FIGS. 1-4, an aircraft engine hybrid roller bearing 101 is provided and includes an inner race 110, an outer race 120, bearing rollers 130 that are radially interposed between the inner race 110 and the outer race 120 to support relative rotation of the inner race 110 and the outer race 120 and a cage 140. The cage 140 is configured to secure each of the bearing rollers 130 at a distance from each neighboring bearing roller 130.

Figures 3, 4:
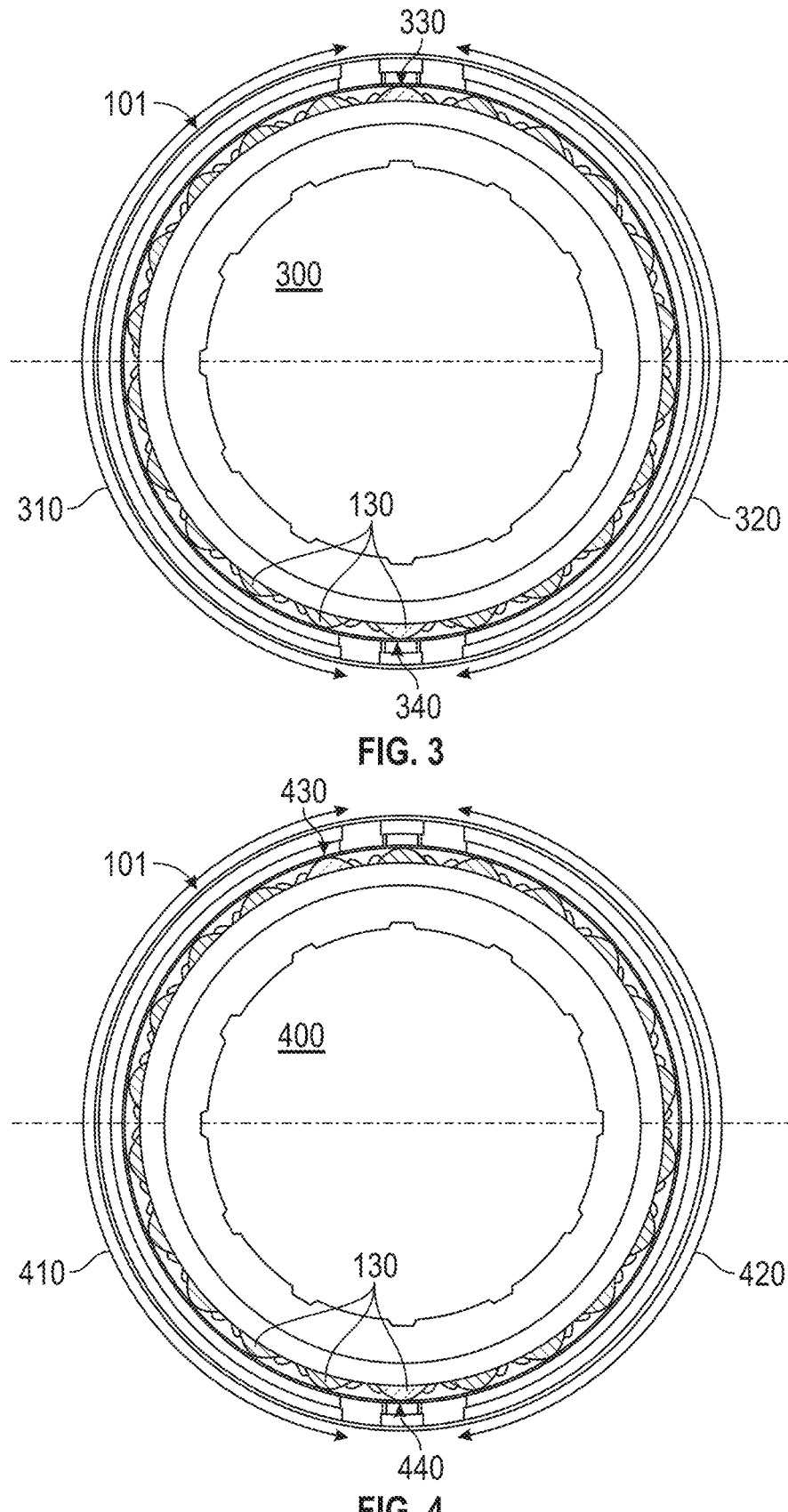
FIG. 3 is an axial view of an aircraft engine hybrid roller bearing with a symmetric arrangement of bearing rollers in accordance with embodiments.
FIG. 4 is an axial view of an aircraft engine hybrid roller bearing with an asymmetric arrangement of bearing rollers in accordance with embodiments.

As shown in FIG. 3, the bearing rollers 130 can be provided in a symmetric arrangement 300 including first and second contiguous circumferential lines 310, 320 of equal numbers of one or more bearing rollers 130 that are formed of a first material type and first and second contiguous circumferential lines 330, 340 of equal numbers of one or more bearing rollers 130 that are formed of a second material type. That is, in an exemplary case, the symmetric arrangement 300 can include the first and second contiguous circumferential lines 310, 320 of ten bearing rollers 130 that are formed of the first material type and the first and second contiguous circumferential lines 330, 340 of one and only one bearing roller 130 formed of the second material type. Of course it is to be understood that other numbers of bearing rollers 130 of the first and second material types can be used (i.e., the symmetric arrangement 300 can include the first and second contiguous circumferential lines 330, 340 of two or more bearing rollers 130 formed of the second material type).

As shown in FIG. 4, the bearing rollers 130 can be provided in an asymmetric arrangement 400 including first and second contiguous circumferential lines 410, 420 of equal or unequal numbers of one or more bearing rollers 130 formed of the first material type and first and second contiguous circumferential lines 430, 440 of equal or unequal numbers of one or more bearing rollers 130 formed of the second material type. That is, in an exemplary case, the symmetric arrangement 400 can include the first and second contiguous circumferential lines 410, 420 of nine and ten bearing rollers 130, respectively, that are formed of the first material type and the first and second contiguous circumferential lines 330, 340 of one and only one bearing roller 130 formed of the second material type. Of course it is to be understood that other numbers of bearing rollers 130 of the first and second material types can be used (i.e., the asymmetric arrangement 400 can include the first and second contiguous circumferential lines 430, 440 of two or more bearing rollers 130 formed of the second material type).

In any case, where the bearing rollers 130 are provided in the asymmetric arrangement 400, the asymmetric arrangement 400 can be tuned to a specific roller bearing frequency response. Thus, in a case in which the hybrid roller bearing 101 is installed in an engine exhibiting a characteristic vibrational frequency during certain operation conditions, the hybrid roller bearing 101 can be provided such that the asymmetric arrangement 400 is tuned to a specific roller bearing frequency response that does not interfere with the characteristic vibrational frequency of the engine to thereby reduce an overall vibratory mode.

In accordance with embodiments, the first material type can have a first characteristic CTE range and the second material type can have a second characteristic CTE range differing from the first characteristic CTE range. In an exemplary case, the first material type can be ceramic (i.e., Silicon Nitride, ASTM F2094) and the second material type can be steel with an IRC of the hybrid roller bearing 101 tuned for tight to negative steel roller bearing clearance. As such, while the ceramic roller bearings and the steel bearing rollers may have substantially similar sizes during certain operational conditions, the steel bearing rollers will have larger sizes than the ceramic bearing rollers at relatively high temperatures.

Technical effects and benefits of the present disclosure are the provision of an aircraft engine roller bearing with rollers of mixed materials that addresses the problem of roller bearing skidding. At relatively low temperatures, all of the rollers will be tuned to have a same size whereas, at relatively high temperatures, steel rollers will expand more than ceramic rollers to handle the loads at those temperatures.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the technical concepts in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

While the preferred embodiments to the disclosure have been described, it will be understood that those skilled in the art, both now and in the future, may make various improvements and enhancements which fall within the scope of the claims which follow. These claims should be construed to maintain the proper protection for the disclosure first described.

What is claimed is:

1. An aircraft engine hybrid roller bearing, the aircraft engine hybrid roller bearing comprising:
an inner race;
an outer race;
bearing rollers radially interposed between the inner race and the outer race to support relative rotation of the inner race and the outer race; and
a cage configured to secure each of the bearing rollers at a distance from each neighboring bearing roller,
the bearing rollers being provided in an arrangement, which is asymmetric, comprising:
a first contiguous set of multiple bearing rollers formed of a first material type, the multiple bearing rollers formed of the first material of the first contiguous set being contiguous with each other and the first contiguous set having a first end and a second end opposite the first end;
a second contiguous set of multiple bearing rollers formed of the first material type, the multiple bearing rollers formed of the first material of the second contiguous set being contiguous with each other and the second contiguous set having a first end and a second end opposite the first end;
a first one and only one bearing roller formed of a second material type interposed between the respective first ends of the first and second contiguous sets of the multiple bearing rollers formed of the first material; and
a second one and only one being roller formed of the second material type interposed between the respective second ends of the first and second contiguous sets of the multiple bearing rollers of the first material type.

2. The aircraft engine hybrid roller bearing according to claim 1, wherein the arrangement of the bearing rollers is tuned to a specific roller bearing frequency response.

3. The aircraft engine hybrid roller bearing according to claim 1, wherein the first material type has a first characteristic coefficient of thermal expansion (CTE) range and the second material type has a second characteristic CTE range differing from the first characteristic CTE range.

4. The aircraft engine hybrid roller bearing according to claim 1, wherein the first material type comprises ceramic and the second material type comprises steel.

5. The aircraft engine hybrid roller bearing according to claim 4, wherein an internal radial clearance (IRC) is tuned for negative steel roller bearing clearance.

6. An aircraft engine hybrid roller bearing, the aircraft engine hybrid roller bearing comprising:
an inner race;
an outer race;
bearing rollers radially interposed between the inner race and the outer race to support relative rotation of the inner race and the outer race; and
a cage configured to secure each of the bearing rollers at a distance from each neighboring bearing roller,
the bearing rollers being provided in an asymmetric arrangement comprising:
a first contiguous circumferential line of multiple bearing rollers formed of a first material type having a first circumferential end and a second circumferential end opposite the first circumferential end;
a second contiguous circumferential line of multiple bearing rollers formed of the first material type having a first circumferential end and a second circumferential end opposite the first circumferential end,
the first and second contiguous circumferential lines having unequal numbers of bearing rollers;
a first one and only one bearing roller formed of a second material type circumferentially interposed between the respective first circumferential ends of the first and second contiguous lines of the multiple bearing rollers formed of the first material; and
a second one and only one bearing roller formed of the second material type circumferentially interposed between the respective second circumferential ends of the first and second contiguous lines of the multiple bearing rollers formed of the first material.

7. The aircraft engine hybrid roller bearing according to claim 6, wherein the arrangement of the bearing rollers is tuned to a specific roller bearing frequency response.

8. The aircraft engine hybrid roller bearing according to claim 6, wherein the first material type has a first characteristic coefficient of thermal expansion (CTE) range and the second material type has a second characteristic CTE range differing from the first characteristic CTE range.

9. The aircraft engine hybrid roller bearing according to claim 6, wherein the first material type comprises ceramic and the second material type comprises steel.

10. The aircraft engine hybrid roller bearing according to claim 9, wherein an internal radial clearance (IRC) is tuned for negative steel roller bearing clearance.

* * * * *